United States Patent
Zhao et al.

(10) Patent No.: US 7,998,009 B2
(45) Date of Patent: Aug. 16, 2011

(54) MECHANICAL AND HYDRAULIC COMPOSITE TRANSMISSION DEVICE

(76) Inventors: Hongjian Zhao, Jiangsu (CN); Hongzhi Zhao, Jiangsu (CN)

( * ) Notice: Subject to any disclaimer, the term of this patent is extended or adjusted under 35 U.S.C. 154(b) by 259 days.

(21) Appl. No.: 12/417,524

(22) Filed: Apr. 2, 2009

(65) Prior Publication Data
US 2009/0227410 A1 Sep. 10, 2009

Related U.S. Application Data

(63) Continuation of application No. PCT/CN2008/070767, filed on Apr. 22, 2008.

(30) Foreign Application Priority Data

Jun. 11, 2007 (CN) .......................... 2007 1 0111137
Oct. 22, 2007 (CN) .......................... 2007 1 0163236
Nov. 29, 2007 (CN) .......................... 2007 1 0195123

(51) Int. Cl.
    *F16H 47/04* (2006.01)
(52) U.S. Cl. ......................................... 475/78; 180/377
(58) Field of Classification Search ........................ None
    See application file for complete search history.

(56) References Cited

U.S. PATENT DOCUMENTS

| | | | | |
|---|---|---|---|---|
| 2,232,992 | A * | 2/1941 | Alexander | 180/53.1 |
| 3,051,259 | A * | 8/1962 | Lorenz | 180/89.14 |
| 7,086,227 | B2* | 8/2006 | Yano et al. | 60/433 |
| 7,357,745 | B2* | 4/2008 | Hidaka et al. | 475/159 |
| 7,416,503 | B2* | 8/2008 | Hiraki et al. | 475/73 |

FOREIGN PATENT DOCUMENTS

| | | |
|---|---|---|
| CN | 2252274 | 4/1997 |
| CN | 1160827 | 10/1997 |
| CN | 2818924 | 9/2006 |
| CN | 101067447 | 11/2007 |
| CN | 101158392 | 4/2008 |
| CN | 101162043 | 4/2008 |
| GB | 2 416 375 | 1/2006 |

OTHER PUBLICATIONS

Yingchen Liu, "The Application of Fluid-flywheel Clutch and Energy Saving Technology" Chemical Industrial Press, Jan. 2006, No. 7-5025-7843-9, pp. 211.
Kepu Wu, "The Hydraulic Transmission Disscussion" Beijing University of Technology, pp. 23-26.

* cited by examiner

*Primary Examiner* — Justin Holmes
(74) *Attorney, Agent, or Firm* — J.C. Patents (57) ABSTRACT

The present invention relates to a mechanical and hydraulic composite transmission device which includes an engine, a transmission, a planetary gear case, a variable displacement hydraulic pump, a hydraulic motor and a transmission gearbox. The planetary gear case distributes the power driven by the engine to drive the variable displacement hydraulic pump and the center gear respectively. The variable displacement hydraulic pump is connected with and drives a hydraulic motor and a half shaft orderly. The half shaft converges a mechanical power flow driven by the center gear and a hydraulic power flow driven by the hydraulic motor, and extends out of the planetary gear case so as to export power. The special vehicle can run at stepless variable speed under the mechanical and hydraulic composite transmission means while the working device on the vehicle is driven under the mechanical transmission means to work.

13 Claims, 5 Drawing Sheets

MECHANICAL AND HYDRAULIC COMPOSITE TRANSMISSION DEVICE

CROSS-REFERENCE TO RELATED APPLICATIONS

This application is a continuation of International Application No. PCT/CN2008/070767, filed on Apr. 22, 2008, which claims the priorities benefit of Chinese Patent Applications No. 200710111137.4, filed on Jun. 11, 2007, No. 200710163236.7, filed on Oct. 22, 2007, and No. 200710195123.5, filed on Nov. 29, 2007. The contents of the above identified applications are incorporated herein by reference in their entirety.

FIELD OF THE TECHNOLOGY

The present invention relates to a transmission device, and particularly to a mechanical and hydraulic composite transmission device.

BACKGROUND

There is a need for a vehicle chassis in many engineering jobs to run working devices along with the vehicle chassis while the working devices implement various jobs, for example, a sweeping car, a reaping machine and so on. The power transmission of some working devices is to drive the vehicle to run and drive the working device to work synchronously by one engine via one mechanical transfer case, for example, a transmission device of the reaping machine. However, the sweeping car and the like need to change their running speed during running and the rotation speed of the engine will be changed when the running speed is changed, which results in decrease of working quality. Therefore, the sweeping car and the like working devices can not use this kind of power transmission method.

At present, the power transmission similar to the working device of the sweeping car has two solutions. One solution is to configure two engines of which one engine is used to drive the vehicle to run and the other engine is used to drive the working device to work. The other solution is to configure a single engine connected with hydraulic transmission. The engine is used to drive a plurality of serially connected hydraulic pumps so as to drive the vehicle to run and drive the working device to work respectively by controlling the plurality of hydraulic pumps and hydraulic motors. Both of the above two solutions have deficiencies. The double engines configuration solution has higher gasoline consumption and more exhaust emissions. Large space in a special vehicle must be occupied to install the double engines. This configuration always uses high power to drive a low load. The solution of the single engine configured hydraulic transmission has lower total transmission efficiency. The efficiency of the hydraulic transmission system is 15%-25% lower than the efficiency of the mechanical transmission system, the transmission efficiency is low and the gasoline consumption is high.

When driving a camion driven by mechanical transmission means on a rough road in mining area, the damage of the engine, the mechanical clutch, the transmission and the driving axle is several times larger than driving on a flat road. Under this circumstance, the car driven by the hydraulic transmission means and having a characteristic of stepless variable speed runs with less power and cost. However, when the camion runs on the flat road, the mechanism of the mechanical transmission means is better so that the transmission efficiency is high and the speed is fast. The market needs parts of vehicles to have a transmission characteristic suitable for different road conditions in one same vehicle. Some domestic and foreign companies are studying and producing an automobile chassis transmission device having good running performance suitable for running on the road such as mining areas, deserts, the icy and snowy roads and swampy fields.

The Hydraulic Transmission Discussion (Author, W U Kejin, "The Hydraulic Industry", hosted by the hydraulic and pneumatic industry of the Mechanical Industry Department, published in total volume 26, May 15, 1987) publishes a hydraulic-mechanical double power flow transmission device of a camion of a foreign company. The hydraulic power flow of this mechanism is achieved by driving a constant displacement hydraulic motor by an axial piston two-way variable displacement hydraulic pump transmission. The mechanical power flow is achieved by a simple planetary transmission system. The duty of the mechanical power branch is as follows: in this mechanism, the power imported by a component is divided into two lines of power to be exported, and the energy of two parts of the power flows transmitted from the hydraulic transmission and the mechanical transmission are converged, then the converged power is exported by an output component. Main operating elements of this transmission are three as follows: a variable rod of a variable displacement pump and clutches L1 and L2. The transmission process of this solution has the following three stages: The first stage is to run forward and backward at a low speed. The clutch L2 is disengaged to cut off the mechanical power branch. The clutch L1 is engaged to make a planetary row gyre as a whole. This stage achieves running forward and backward by operating the variable rod. This stage is hydraulic transmission. The second stage is to increase the speed of the vehicle. Under the circumstance of running forward at a low speed, after the output volume of the pump is adjusted to the maximum position, the clutch L1 is disengaged and the clutch L2 is engaged so that the planetary row starts to work. Then the variable rod of the variable displacement pump is adjusted gradually from a plus maximum position towards the direction of reducing the output volume. This stage is hydraulic-mechanical composite transmission. In the third stage, the speed of the vehicle is further increased and the adjusting method is that the variable rod of the pump is adjusted from the zero position towards minus direction of the output volume. Then inclination of a sloping cam plate of the pump is changed, therefore, the hydraulic motor also rotates reversely. The adjustment is proceeding gradually until the variable rod of the pump reaches to the minus maximum position of the output volume. Then the camion obtains the maximum running forward speed. The third stage is also hydraulic-mechanical composite transmission. The hydraulic-mechanical composite transmission solution has the following deficiencies: (1) The first stage operating in this solution is the hydraulic transmission so the transmission efficiency is low; (2) Based on analysis to the direction of the power flow passing in the second stage, there is recurrent power; (3) In the operation of the third stage, the ratio of the hydraulic power flow to the mechanical power flow is changed continually so that the total converged transmission efficiency is not steady; (4) The operating method of this solution is complex and difficult to master, which is not compatible with general operating main essentials of common vehicles, and when a driver is driving the vehicle, he is easy to have operating errors causing accidents because of a habitual action.

Both of the blast furnace and the mine need to be blasted or aired by high-power blowers. Some continuous equipment, such as large scale equipment or a conveyor, need to be driven by high-power electric motors. When these equipment start, a lot of start-up drag torque should be overcome, and the power-supply network of the equipment should avoid being attacked by start-up current. Some equipment need good speed adjusting performance during running. *The Application of Fluid-flywheel Clutch and Energy Saving Technology* (written by LIU Yingcheng and YANG Naiqiao, published by chemical industry press, the first edition of January, 2006) publishes a selection of transmission means of a speed-adjusting-type fluid-flywheel clutch (Chapter 6, Section 7, Subsection 3, Tables 6-8). In many kinds of speed adjusting transmission means listed in the above tables, when a single electric motor is connected with the speed-adjusting-type fluid-flywheel clutch in series, the transmission efficiency of this mechanism is low and the power configured for the fluid-flywheel clutch is large. When several electric motors are connected with the speed-adjusting-type fluid-flywheel clutch in series or in parallel, the structure of this mechanism is complex and the investment is high.

SUMMARY

The object of the present invention is to provide a mechanical and hydraulic composite transmission device. When the device is installed and used on a vehicle, the vehicle not only can be driven by the mechanical transmission means to run fast, but also can be driven by the mechanical and hydraulic composite transmission means to run at a stepless variable speed. When the vehicle is modified to be a special vehicle for engineering job configured with a single engine, the engine rotates in the stage of medium speed, and a branch transmission device synchronously exports power in the mechanical transmission means so as to drive the working device on the vehicle to work steadily. Configuration of a secondary engine is reduced and the space of the vehicle is saved. It has merits of high transmission efficiency, simple structure, convenient operation and so on, which effectively solves the above deficiencies in the prior art.

In order to accomplish the above object, the present invention provides a mechanical and hydraulic composite transmission device comprising an engine, a variable displacement hydraulic pump and a hydraulic motor, wherein the engine is connected with and drives a planetary gear case, a planetary gear mechanism of the planetary gear case distributes the power driven by the engine to drive the variable displacement hydraulic pump and a half shaft respectively, the variable displacement hydraulic pump orderly is connected with and drives the hydraulic motor and the half shaft, and the half shaft converges a hydraulic power flow driven by the hydraulic motor and a mechanical power flow distributed and driven by the planetary gear mechanism to export power; the engine is connected with and drives a transfer shaft, a transfer gear tightly covers and is fixed to one part of the transfer shaft extending into the planetary gear case, and the transfer gear engages with and drives a transition gear; the transition gear is connected with a planetary carrier coaxially and fixedly, two or three planetary shafts are connected and mounted to the output end of the planetary carrier vertically and equably, one planetary gear covers each of the planetary shafts respectively, and all the planetary gears synchronously engage with and drive a sun gear and internal teeth of a center gear; the center gear is connected with and drives the half shaft, the sun gear is connected and mounted to one end of a mean axis, and the other end of the mean axis passes through the planetary carrier and the transition gear, and extends out of the planetary gear case to be connected with and drive the variable displacement hydraulic pump; the variable displacement hydraulic pump is connected with and drives the hydraulic motor by a hydraulic pipeline, the hydraulic motor is connected with and drives a hydraulic drive shaft, and the other end of the hydraulic drive shaft extends into the planetary gear case to make the hydraulic drive gear be connected and mounted to the other end of the hydraulic drive shaft, an assembling gear covers one part of the half shaft, and the hydraulic drive gear engages with and drives the assembling gear; the half shaft converges a mechanical power flow driven by the center gear and a hydraulic power flow driven by the hydraulic drive gear, and extends out of the planetary gear case to export power.

Said engine mounted to a truck frame is connected with and drives a transmission. A power-take-off is connected and mounted to a power-take-off interface of the transmission. A clutch device separated with or connected to drive the transmission is set in the power-take-off. An operating handle used for operating the clutch device is set in a cab. The power-take-off is connected with and drives a drive shaft. The drive shaft is connected with and drives a transfer shaft. A front frame and a back frame are fixed tightly to the truck frame respectively. The planetary gear case is suspended under the front frame. And a transmission gearbox is suspended under the back frame. One end of the half shaft extending out of the planetary gear case is connected with and drives a transmission transition shaft. A final transmission gear tightly covers and is fixed to one part of the transmission transition shaft extending into the transmission gearbox. An output shaft is covered with a supplementary transmission gear and an electromagnetic clutch tightly covers and is fixed to the output shaft. A junction surface on an inner bore of the electromagnetic clutch is tightly and fixedly connected with the output shaft. A junction surface on a plane of the electromagnetic clutch is tightly and fixedly connected with the supplementary transmission gear. The final transmission gear engages with and drives the supplementary transmission gear. An electromagnetic clutch switch for operating the electromagnetic clutch to disengage or engage is set in the cab. The transmission is further connected with and drives the front drive shaft. The other end of the front drive shaft is connected with and drives one end of the output shaft extending out of the transmission gearbox. The other end of the output shaft extending out of the transmission gearbox is connected with and drives the back drive shaft. The back drive shaft is connected with and drives a rear-axle shaft to drive a vehicle.

In said cab, there is provided with an accelerator pedal and a hand throttle device, and is also provided with a variable displacement hydraulic pump foot pedal which is interlocked with the accelerator pedal to controls the variable displacement hydraulic pump. The variable displacement hydraulic pump foot pedal is actively connected with the accelerator pedal with its zero position corresponding to a medium speed position of the accelerator pedal.

Said engine and the front frame are mounted to the truck frame. The planetary gear case is suspended under the front frame. The engine is connected with and drives the front drive shaft by the transmission. The other end of the front drive shaft is connected with and drives the transfer shaft of the planetary gear case. The half shaft of the planetary gear case is connected with and drives the back drive shaft. And the back drive shaft is connected with and drives the rear-axle shaft to drive the vehicle. Both of the variable displacement hydraulic pump and the hydraulic motor may be two-way rotated, and a hand throttle device and a variable displacement hydraulic pump foot pedal are set in the cab.

A retarding disc of said disk brake tightly covers and is fixed to said mean axis and a caliper base of the disk brake is fixed to a case body of the planetary gear case. The assembling gear actively covers the half shaft and an inner loop of the clutch tightly covers and is fixed to the half shaft so that the transmission connection between the assembling gear and the half shaft may be engaged or disengaged by operating the clutch. An accelerator pedal is set in the cab. The zero position of the accelerator pedal is actively connected with the zero position of the variable displacement hydraulic pump foot pedal to form linkage action.

The present invention provides a new mechanical and hydraulic composite transmission technical solution which makes the vehicles not only run at stepless variable speed under the mechanical and hydraulic composite drive but also run forward and backward under the mechanical drive. In addition, the mechanical power flow and the hydraulic power flow are overlapped to be exported in the same direction of drive. In the composite transmission process, there is not recurrent power and there are merits such as higher transmission efficiency, lower gasoline consumption and so on.

When the mechanical and hydraulic composite transmission device of the present invention is applied to a special vehicle which needs power to drive the working device on the vehicle, the special vehicle is configured with signal engine power and the space occupied by installing the power system is small. When working, the engine rotates at a medium speed and the vehicle is driven by the mechanical and hydraulic composite transmission means to run at stepless variable speed so that it can synchronously provide power in the mechanical transmission means to drive the working device installed on the vehicle to work. It has good handling quality and is convenient. By adjusting the hand throttle device to adjust the rotation speed of the engine, the power exported to the working device can be adjusted steplessly. The power for driving the working device is steady and the working quality is good. When workplace is changed, the vehicle is driven by the mechanical transmission means, and the running speed is fast. During the power transmission process of the vehicle, the mechanical transmission power occupies most of the total transmission power, the total transmission efficiency of the vehicle is high, the gasoline consumption is low and the exhaust is low. When the mechanical and hydraulic composite transmission device is applied to the special vehicle such as a sweeping car, a high pressure washing car and a fire fighting truck, limited space of the vehicle satisfies the usage need of the special vehicle more reasonably.

When the mechanical and hydraulic composite transmission device of the present invention is applied to a cargo vehicle running in mining area, the cargo vehicle could run on the rough road in the mining area at stepless variable speed without jamming the clutch frequently to change threshold and adjust the speed. The operation is comfortable and convenient, the stability of the vehicle is good and the damage to the parts of the vehicle is slight. When the road is flat, it is convenient to change the vehicle to be driven by mechanical transmission means so as to run fast.

When a military vehicle modified by using the mechanical and hydraulic composite transmission technology of the present invention runs in the desert, on the snow-icing road or on the swampy road, it may run extremely slowly at stepless variable speed, and its operation is simple. When the military vehicle is used as a tractor to drag weight equipment, such as artillery, to move on the swampy road, one hydraulic transmission branch mechanism may be connected to the mechanical and hydraulic composite transmission device in series and it is connected to a wheel train of the dragged vehicle. The dragging vehicle could interlocks with this hydraulic transmission branch mechanism at extremely slow speed to synchronously drive the dragged vehicle to move. There are transmission characteristics that the speed is low, the torque is large, and the dragging vehicle and the dragged vehicle are driven synchronously. The traffic capacity of the special vehicle on the special road is strengthened.

When the mechanical and hydraulic composite transmission device of the present invention is applied to a blower transmission system of a mine or a blast furnace, or is applied to a transmission system of large scale equipment or a continuous equipment, its merits are as follows: (1) The engine may be replaced with an electric motor. The electric motor could start with no-load under the circumstances of being connected with working machine load. After the electric motor is started and reaches a working speed, then the working machine is started, and the load is added slowly. The rotation speed of the working machine is increased gradually, which could reduce impulsion imposed on the power-supply system of the device by the starting current. The equipped capacitor of the electric motor does not need to be configured with a extremely large power, which could reduce investment on the equipment; (2) The stepless speed variation from zero to the maximum rotation speed could be achieved, and the governor deflection is large; (3) During the composite transmission process, the hydraulic power flow is less than or equal to the mechanical power flow. The transmission efficiency is high; (4) There is no need to install a clutch device between the electric motor and the working machine so that the structure is simple and the operation is convenient.

BRIEF DESCRIPTION OF THE DRAWINGS

FIG. 6 is a supplementary transmission schematic diagram of the basic structure of the third embodiment according to the present invention, in which

| | | |
|---|---|---|
| 1-cab | 2-engine | 3-transmission |
| 4-truck frame | 5-variable displacement hydraulic pump | 6-front frame |
| 7-back frame | 8-operating handle | 9-electromagnetic clutch switch |
| 10-hand throttle device | 11-accelerator pedal | 12-hydraulic pump foot pedal |
| 13-power-take-off | 14-drive shaft | 15-transfer shaft |

-continued

| | | |
|---|---|---|
| 16-transfer gear | 17-planetary gear case | 18-hydraulic motor |
| 19A-front drive shaft | 19B-back drive shaft | 20-transmission gearbox |
| 21-rear-axle shaft | 22-clutch | 23-transmission |
| 24-center gear | 25-output shaft | 26-supplementary transmission gear |
| 27-half shaft | 28-hydraulic pipeline | 29-transition gear |
| 30-planetary gear | 31-planetary shaft | 32-assembling gear |
| 33-planetary carrier | 34-hydraulic drive gear | 35-hydraulic drive shaft |
| 36-electromagnetic clutch | 37-final transmission gear | 38-mean axis |
| 39-sun gear | 40-transmission transition shaft | 41-traction gear |
| 42-traction hydraulic motor | 43-gear hydraulic pump | 44-traction transition shaft |
| 45-clutch | 46-disk brake | |

DETAILED DESCRIPTION

The present invention will be described in more detail with reference to the drawings and embodiments.

Figure 1:
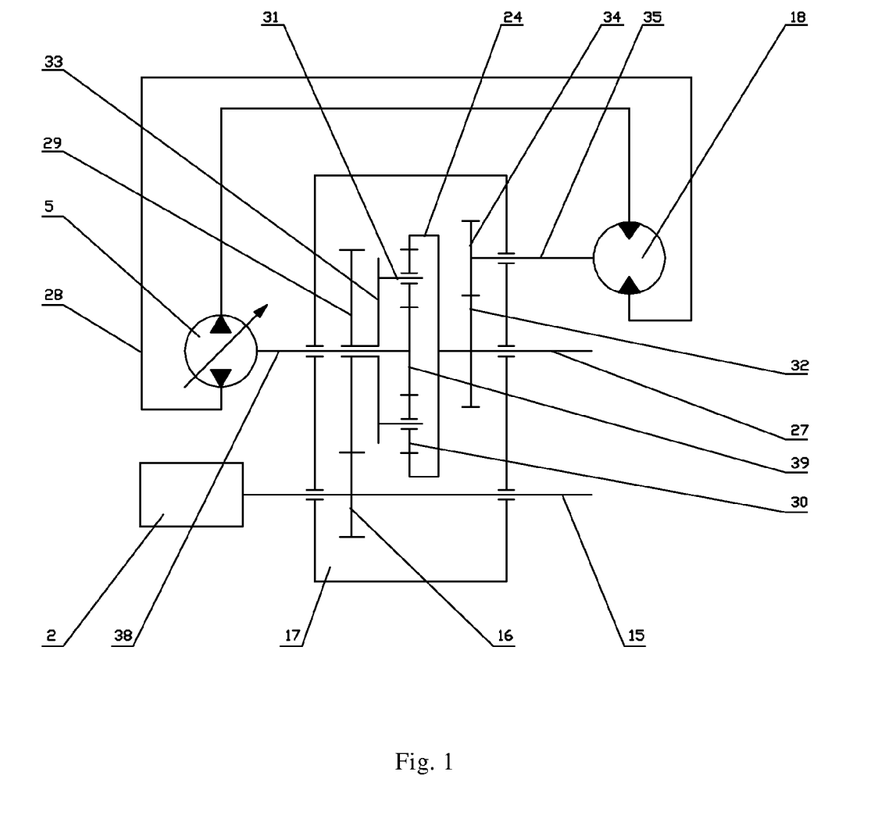
FIG. 1 is a transmission schematic diagram of the basic structure of the mechanical, hydraulic composite transmission device according to the present invention.

FIG. 1 is a transmission schematic diagram of the basic structure of the mechanical, hydraulic composite transmission device according to the present invention. As shown in FIG. 1, the mechanical hydraulic composite transmission device of the present invention includes an engine 2, a variable displacement hydraulic pump 5 and a hydraulic motor 18. The engine 2 is connected with and drives a transfer shaft 15 of a planetary gear case 17. A transfer gear 16 tightly covers and is fixed to one part of the transfer shaft 15 extending into the planetary gear case 17. The transfer gear 16 engages with and drives a transition gear 29. The transition gear 29 is connected with a planetary carrier 33 coaxially and fixedly. Two or three planetary shafts 31 are installed on the output end of the planetary carrier 33 vertically and equably. One planetary gear 30 covers each of the planetary shafts 31 respectively. The planetary gears 30 synchronously engage with and drive a sun gear 39 and internal teeth of a center gear 24. The center gear 24 is connected with and drives the half shaft 27. The sun gear 39 is connected and mounted to one end of a mean axis 38, the other end of the mean axis 38 passes through the planetary carrier 33 and the transition gear 29, then extends out of the planetary gear case 17 so as to be connected with and drive the variable displacement hydraulic pump 5. The variable displacement hydraulic pump 5 is connected with a hydraulic pipeline 28 and is connected with and drives the hydraulic motor 18 by the hydraulic pipeline 28. The hydraulic motor 18 is connected with and drives a hydraulic drive shaft 35. The other end of the hydraulic drive shaft 35 extends into the planetary gear case 17 to be connected and mounted with the hydraulic drive gear 34. An assembling gear 32 covers and is fixed to the half shaft 27. The hydraulic drive gear 34 engages with and drives the assembling gear 32. The planetary carrier 33, the planetary shafts 31 and the planetary gear 30 distribute the power driven by the engine 2 to drive the variable displacement hydraulic pump 5 and the half shaft 27 respectively. The half shaft 27 converges a mechanical power flow driven by the center gear 24 and a hydraulic power flow driven by the hydraulic motor 18, and extends out of the planetary gear case 17 to export power.

The First Embodiment

In the present embodiment, the mechanical and hydraulic composite transmission device of the present invention is applied to a transmission system of large scale equipment, which is described in detail with reference to FIG. 1.

The engine 2 is connected with and drives the planetary gear case 17. The half shaft 27 is connected with and drives a load working machine. The engine 2 is started to be connected with and drive the transfer shaft 15 to rotate. The transfer gear 16 is tightly fixed to the transfer shaft 15 in the planetary gear case 17. The transfer shaft 15 interlocks with and drives the transfer gear 16 to rotate. The transfer gear 16 engages with and drives the transition gear 29 to rotate. The transition gear 29 interlocks with and drives the planetary carrier 33 tightly and fixedly connected to rotate. The planetary carrier 33 interlocks with and drives the two or three planetary shaft 31 mounted on the output end of the planetary carrier 33 vertically and equably to rotate, and drives the planetary gears 30 covering on each planetary shafts 31 respectively to rotate. The planetary gears 30 rotate around the planetary shafts 31, and synchronously make a revolution around the axle center of the planetary carrier 33. The planetary gears 30 engage with and drive the sun gear 39 and the internal teeth of the center gear 24 synchronously. Because the center gear 24 is connected with and drives the half shaft 27 and the half shaft 27 is connected with and drives the load working machine, under the action of the working machine load, the half shaft 27 and the center gear 24 do not rotate, the sun gear 39 rotates by being engaged with and driven by the planetary gear 30 and drives the mean axis 38 to rotate. The mean axis 38 passes through the planetary carrier 33 and transition gear 29, and extends out of the planetary gear case 17 to be connected with and drive the variable displacement hydraulic pump 5 to rotate. Because the original inclination of a sloping cam plate of the variable displacement hydraulic pump 5 is zero degree, the variable displacement hydraulic pump 5 is running idle to export neither hydraulic oil nor power.

The variable displacement hydraulic pump 5 is operated to change the inclination of the sloping cam plate of the variable displacement hydraulic pump 5. The variable displacement hydraulic pump 5 exports the hydraulic oil to pass through the hydraulic pipeline 28 so as to be connected with and drive hydraulic motor 18 to rotate. The hydraulic motor 18 is connected with and drives the hydraulic drive shaft 35 to rotate. The hydraulic drive shaft 35 extends into the planetary gear case 17 to be connected with and drive the hydraulic drive gear 34 to rotate. The assembling gear 32 covers tightly and fixedly on the half shaft 27. The hydraulic drive gear 34 engages with and drives the assembling gear 32 to rotate and interlocks with and drives the half shaft 27 to rotate. The half shaft 27 is connected with and drives the working machine to rotate. Pipeline connection between the hydraulic pipeline 28 and the variable displacement hydraulic pump 5 and the hydraulic motor 18 is adjusted to make the rotation direction of the working machine driven by the hydraulic power flow driven by the hydraulic motor 18 be conformable with the rotation direction of the working machine driven by the mechanical power flow driven by the center gear 24. The half shaft 27 orderly feeds back the drag torque for driving the working machine for rotation to the assembling gear 32, the hydraulic drive gear 34, the hydraulic drive shaft 35, the hydraulic motor 18, the variable displacement hydraulic pump 5, the mean axis 38, the sun gear 39, the planetary gear 30 and the planetary shaft 31. Under combined action of the planetary gear mechanism and the rotation of the planetary carrier 33, the planetary shaft 31 and the planetary gear 30 make the drag torque fed back by the half shaft 27 act on the center gear 24 and make the center gear 24 and the sun gear 39 rotate in the same direction. The center gear 24 also interlocks with and drives the half shaft 27 to rotate so as to drive the working machine to rotate. The planetary carrier 33, the planetary shaft 31 and the planetary gear 30 distribute the power driven by the engine 2 to respectively drive the sun gear 39 and the center gear 24 to rotate. The half shaft 27 converges the hydraulic power flow driven by the hydraulic motor 18 and the mechanical power flow driven by the center gear 24 to be connected with and drive the load working machine to rotate.

Continuous adjustment on the inclination of the sloping cam plate of the variable displacement hydraulic pump 5 can change the flow amount of the hydraulic oil exported by the variable displacement hydraulic pump 5 and synchronously change the hydraulic power exported by the variable displacement hydraulic pump 5, the rotation speed of the hydraulic motor 18, the power and rotation speed driven by the sun gear 39 and the mean axis 38, the mechanical power driven by the center gear 24 as well as the rotation speed of the center gear 24. The half shaft 27 converges the mechanical power and the hydraulic power changed synchronously and converges the rotation speed of the center gear 24 and the hydraulic motor 18 changed synchronously to drive the working machine to rotate at stepless variable speed. The mechanical and hydraulic composite transmission device in the present embodiment is applied to the transmission system of the large scale equipment and makes the equipment rotate at stepless variable speed.

In the present embodiment, the engine 2 may be replaced by an electric motor equivalently.

The structure of the present embodiment may be further improved. In the transmission device, in which the electric motor is connected with and drives the working device load by the planetary gear case 17, a clutch is connected behind the electric motor in series. A mechanical transmission connected with the planetary gear case 17 in parallel and between the clutch and the load working machine. A working machine is started by the planetary gear case 17. When the working machine starts and reaches a working speed, the clutch is operated to make the working machine connected with and driven by the planetary gear case 17 be switched to be connected with and driven by the mechanical transmission.

When the technology of the present invention is applied to the transmission system of the large scale equipment, it will bring in the following positive effects:

(1). Under the condition of being connected with a load, a power generating machine could be started with idle load. After the power generating machine is started, the load working machine is slowly started again to rotate. The equipment does not need to select a power generating machine with overlarge capacity because of an overlarge start-up drag torque. The clutch device does not need to be installed between the power generating machine and the working machine so as to reduce the first capitalized cost on the equipment;

(2). The two-stage starting can reduce impulse load. When the power generating machine is an electric motor, the impulse load influence on power-supply network of the equipment can be reduced and the running quality of the equipment is improved;

(3). During the running processing of the equipment, the speed could be adjusted steplessly. The speed adjusting range is wide. In the planetary gear mechanism, the torque driven by the center gear is not equal to the torque driven by the sun gear. The mechanical transmission power in the mechanical and hydraulic composite transmission occupies most of the total transmission power. There is not recurrent power in the composite transmission, and there is steady and high transmission efficiency;

(4). The transmission solution that the clutch is connected in series and the mechanical transmission is connected in parallel starts the equipment by the mechanical and hydraulic composite transmission device and drives the equipment to run by the mechanical transmission means. The transmission efficiency is high and the impulse load is reduced when the equipment is started.

The Second Embodiment

Figure 2:
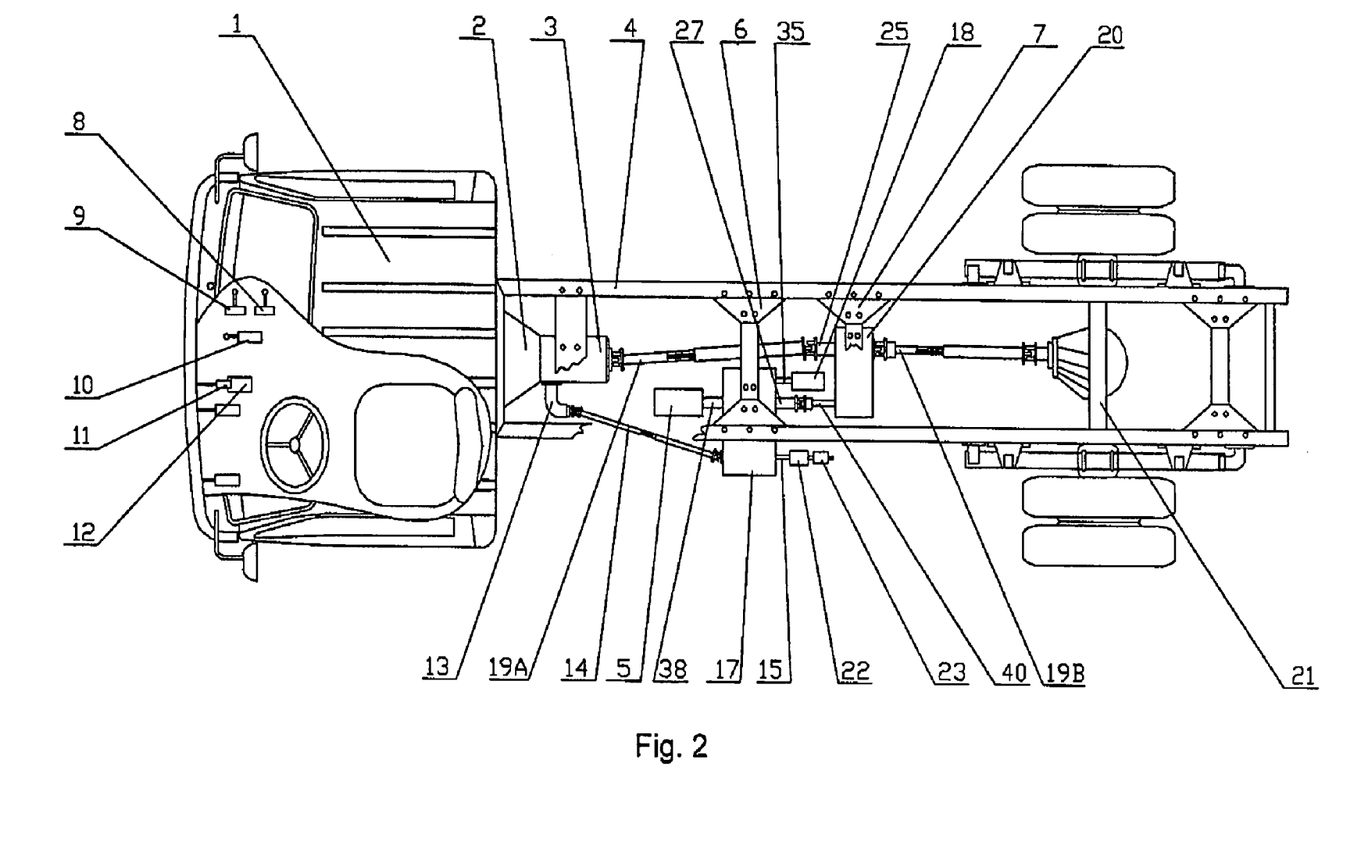
FIG. 2 is a structural diagram of the second embodiment according to the present invention.
Figure 3:
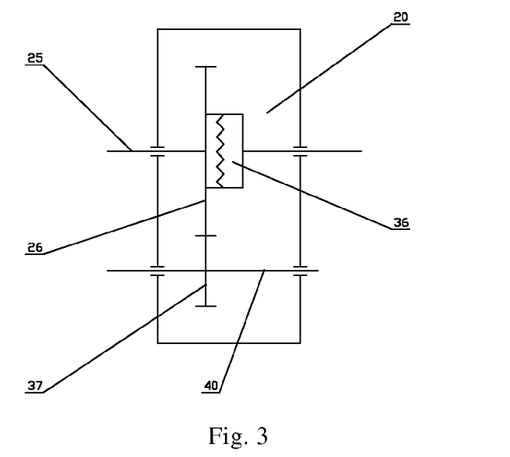
FIG. 3 is a structural diagram of the parts transmission gearbox in the second embodiment according to the present invention.
Figure 4:
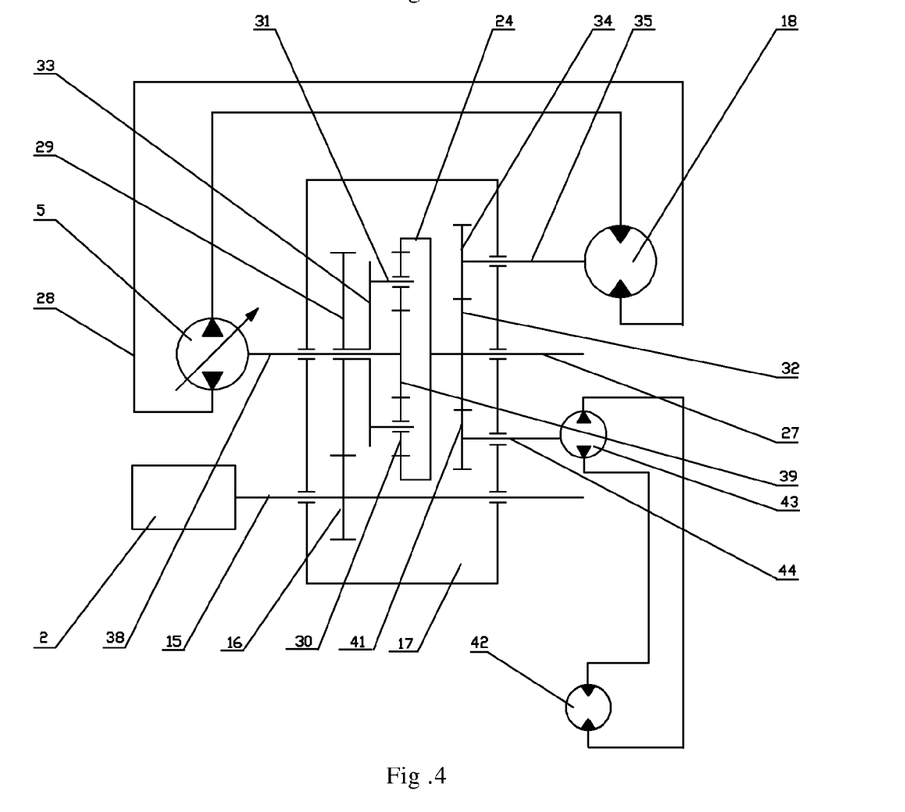
FIG. 4 is a supplementary transmission schematic diagram of the basic structure of the second embodiment according to the present invention.

FIG. 2 is a structural diagram of the mechanical and hydraulic composite transmission device in the second embodiment according to the present invention. FIG. 3 is a structural diagram of the transmission gearbox in the second embodiment. FIG. 4 is a supplementary transmission schematic diagram of basic structure of the second embodiment according to the present invention.

As shown in FIG. 2 and FIG. 3, a cab 1, the engine 2, the transmission 3, the front frame 6 and the back frame 7 are mounted to the truck frame 4 respectively. The planetary gear case 17 is suspended under the front frame 6. The transmission gearbox 20 is suspended under the back frame 7. The engine 2 is connected with and drives the transmission 3. A power-take-off 13 is mounted to a power-take-off interface of the transmission 3. The power-take-off 13 is provided with a clutch device therein, which is connected to drive and disengages with the transmission 3. An operating handle 8 which is used for engaging or disengaging the connection driving between the clutch power-take-off 13 and the transmission 3, is set in the cab 1. The power-take-off 13 is connected with and drives the drive shaft 14. The drive shaft 14 is connected with and drives the transmission transfer shaft 15. A transfer gear 16 tightly covers and is fixed to one part of the transfer shaft 15 extending into the planetary gear case 17. The transfer gear 16 engages with and drives a transition gear 29. The transition gear 29 is connected with the planetary carrier 33 coaxially and fixedly. Two or three planetary shafts 31 are connected with and mounted on the output end of the planetary carrier 33 vertically and equably. One planetary gear 30 covers each of the planetary shafts 31 respectively. The planetary gears 30 synchronously engage with and drive a sun gear 39 and internal teeth of a center gear 24. The center gear 24 is connected with and drives the half shaft 27. One end of a mean axis 38 is mounted with the sun gear 39 and transmits the driving motion of the sun gear 39. The other end of the mean axis 38 passes through the planetary carrier 33 and the transition gear 29, and then extends out of the planetary gear case 17 so as to be connected with and drive the variable displacement hydraulic pump 5. The variable displacement hydraulic pump 5 is connected with a hydraulic pipeline 28 and is connected with and drives the hydraulic motor 18 by the hydraulic pipeline 28. The hydraulic motor 18 is connected with and drives a hydraulic drive shaft 35. The other end of the hydraulic drive shaft 35 extends into the planetary gear case 17 to make the hydraulic drive gear 34 be connected and mounted to the other end of the hydraulic drive shaft 35. An assembling gear 32 tightly covers and is fixed to the half shaft 27. The hydraulic drive gear 34 engages with and drives the assembling gear 32. The planetary carrier 33, planetary shafts 31 and the planetary gear 30 distribute the power driven by the engine 2 to drive the sun gear 39 and the center gear 24 respectively to rotate. The end of the half shaft 27 extending out the planetary gear case 17 is mounted to a transmission transition shaft 40. The half shaft 27 converges the hydraulic power flow driven by the hydraulic motor 18 and the mechanical power flow driven by the center gear 24 to be connected with and drive the transmission transition shaft 40 to rotate. One part of the transmission transition shaft 40 extending into the transmission gearbox 20 is tightly and fixedly covered with a final transmission gear 37. An output shaft 25 is covered with a supplementary transmission gear 26, and tightly and fixedly covered with an electromagnetic clutch 36. Junction surface on an inner bore of the electromagnetic clutch 36 is tightly and fixedly connected with the output shaft 25, and junction surface on a plane of the electromagnetic clutch 36 is tightly and fixedly connected with the supplementary transmission gear 26. An electromagnetic clutch switch 9 is set in the cab 1. The final transmission gear 37 engages with and drives the supplementary transmission gear 26. By operating the electromagnetic clutch switch 9, the connection and transmission between the supplementary transmission gear 26 and the output shaft 25 could be disengaged and engaged by the electromagnetic clutch 36. The transmission 3 is further connected with and drives a front drive shaft 19A. The other end of the front drive shaft 19A is connected with and drives one end of the output shaft 25 extending out of the transmission gearbox 20. The other end of the output shaft 25 which also extends out the transmission gearbox 20 from the other side is connected with and drives a back drive shaft 19B, and the back drive shaft 19B is connected with and drives a rear-axle shaft 21. In the cab 1, there is provided with a hand throttle device 10, an accelerator pedal 11 and a variable displacement hydraulic pump foot pedal 12 which is interlocked with the accelerator pedal 11 and is used to control the variable displacement hydraulic pump 5 by the accelerator pedal 11. The variable displacement hydraulic pump foot pedal 12 is actively connected with the accelerator pedal 11 where the zero position of the variable displacement hydraulic pump foot pedal 12 corresponds to the medium speed position of the accelerator pedal 11. In the present embodiment, the engine 2 can be orderly connected with and drive the transmission 3, the power-take-off 13, the drive shaft 14, the planetary gear case 17, the transmission gearbox 20 and the back drive shaft 19B to rotate. The back drive shaft 19B drives the rear-axle shaft 21 to rotate and then drives the vehicle to run. The engine 2 can also be orderly connected and drive the transmission 3, the front drive shaft 19A, the output shaft 25 and the back drive shaft 19B to rotate. The back drive shaft 19B drives the rear-axle shaft 21 to rotate and then drives the vehicle to run. The end of said transfer shaft 15 which passes through the planetary gear case 17 is orderly connected and mounted to the clutch 22 and the transmission 23. When the engine 2 is orderly connected with and drives the planetary gear case 17 and the transmission gearbox 20 to drive the vehicle to run, at the same time the transfer shaft 15 is orderly connected with and drives the clutch 22 and the transmission 23, and the transmission 23 is connected with and drives the working device on the vehicle.

The operating process of the present embodiment is as follows: the transmission 3 is operated in the neutral position and the transmission connection between the transmission 3 and the front drive shaft 19A is disconnected; the operating handle 8 is operated to make the power-take-off 13 be connected with the driving motion of the transmission 3, and the electromagnetic clutch switch 9 is operated to make the electromagnetic clutch 36 be connected with the driving motion of the supplementary transmission gear 26 and the output shaft 25; the engine 2 is started, the hand throttle device 10 is operated to make the engine rotate at a medium speed, and the engine 2 is orderly connected with and drives the transmission 3, the power-take-off 13, the drive shaft 14, the transfer shaft 15, the transfer gear 16, the transition gear 29, the planetary carrier 33, the planetary shaft 31 and the planetary gear 30 to rotate; because the drag torque produced by the rotation of the half shaft 27 and the differential function of the planetary gear mechanism, the center gear 24 and the half shaft 27 do not rotate, and the sun gear 39 and the mean axis 38 rotate to interlock with and drive the variable displacement hydraulic pump 5 to rotate. The inclination of the sloping cam plate in the variable displacement hydraulic pump 5 is zero degree, the variable displacement hydraulic pump 5 is running idle without exporting the hydraulic oil, the hydraulic motor 18 does not rotate, and the engine 2 rotates and drives the planetary gear mechanism. The planetary gear mechanism does not export power to drive the vehicle, and the vehicle is at a standstill status. The accelerator pedal 11 is pressed to exceed the medium speed position, and interlocks with and drives the variable displacement hydraulic pump foot pedal 12. The variable displacement hydraulic pump foot pedal 12 sends a control signal to make the inclination of the sloping cam plate of the variable displacement hydraulic pump 5 be changed. The variable displacement hydraulic pump 5 rotates and exports the hydraulic oil passing through the hydraulic pipeline 28 to be connected with and drive the hydraulic motor 18 to rotate. The hydraulic motor 18 orderly drives the hydraulic drive shaft 35, the hydraulic drive gear 34, the assembling gear 32 and the half shaft 27 to rotate; the half shaft 27 drives the transmission transition shaft 40 to rotate. The transmission transition shaft 40 interlocks with and drives the final transmission gear 37 to rotate. The final transmission gear 37 engages with and drives the supplementary transmission gear 26 to rotate. The supplementary transmission gear 26 is connected with and drives the output shaft 25 to rotate by the electromagnetic clutch 36. The output shaft 25 drives the back drive shaft 19B to rotate. The back drive shaft 19B drives the rear-axle shaft 21 to rotate so as to drive the vehicle to run. The mean axis 38 and the sun gear 39 feed back the drag torque, which is caused when the variable displacement hydraulic pump 5 exports the hydraulic power to drive the half shaft 27 so as to drive the vehicle to run, to the planetary gear mechanism. Under combined action of the action of the planetary gear mechanism and the rotation of the planetary carrier 33, the planetary shaft 31 and the planetary gear 30 drive the center gear 24 to rotate while driving the sun gear 39 to rotate. The center gear 24 is connected with and drives the half shaft 27 to rotate. Pipeline connection relationship between the variable displacement hydraulic pump 5 and the hydraulic pipeline 28 and the hydraulic motor 18 is adjusted to make the rotation direction of the half shaft 27 driven by the hydraulic motor 18 be conformable with the rotation direction of the half shaft 27 driven by the center gear 24. The half shaft 27 converges the hydraulic power flow driven by the hydraulic motor 18 and the mechanical power flow driven by the center gear 24 to orderly drive the transmission transition shaft 40, the final transmission gear 37, the supplementary transmission gear 26, the electromagnetic clutch 36, the output shaft 25, the back drive shaft 19B and the rear-axle shaft 21 to rotate. The rear-axle shaft 21 drives the vehicle to run. The accelerator pedal 11 is pressed to exceed the medium speed position to increase the oil mass importing the engine 2, and increase the output power of the engine 2, which satisfies the power required to be added for driving the hydraulic motor 18 to rotate, wherein the hydraulic motor 18 is driven by the hydraulic oil exported from the variable displacement hydraulic pump 5, and the variable displacement hydraulic pump 5 is controlled by the variable displacement hydraulic pump foot pedal 12 interlocked and driven. The accelerator pedal 11 is pressed sequentially to interlock with and drive the variable displacement hydraulic pump foot pedal 12. The variable displacement hydraulic pump foot pedal 12 controls the variable displacement hydraulic pump 5 to changeably export the hydraulic oil so as to drive the hydraulic motor 18 to rotate at variable speed. Under the effect of the planetary gear mechanism, the center gear 24 also rotates at variable speed. The half shaft 27 superposes a variable hydraulic power flow driven by the hydraulic motor 18 and a variable mechanical power flow driven by the center gear 24 to drive the transmission gearbox 20 at variable speed. The transmission gearbox 20 drives the back drive shaft 19B and the rear-axle shaft 21 at variable speed so as to drive the vehicle to run at variable speed. The vehicle modified by using the present invention technology achieves running at stepless variable speed under the mechanical and hydraulic composite transmission.

The modified vehicle in the present embodiment may further be changed to run forward and backward under the mechanical transmission means, and the operating process is as follows: the hand throttle device 10 is operated to restore so as to make the engine 2 flameout. The electromagnetic clutch switch 9 is operated to make the electromagnetic clutch 36 be disconnected from the transmission connection between the supplementary transmission gear 26 and the output shaft 25. The operating handle 8 is disconnected from the transmission connection between the transmission 3 and the power-take-off 13. The vehicle is restored with the mechanical transmission for the engine 2 to orderly drive the transmission 3, the front drive shaft 19A, the output shaft 25, the back drive shaft 19B and the rear-axle shaft 21. The engine 2 is started, the transmission 3 is operated to be in a forward threshold or a backward threshold, and the accelerator pedal 11 is pressed. The vehicle runs forward or backward under the mechanical transmission means. The vehicle modified by using the mechanical and hydraulic composite transmission technology of the present invention is changed to run forward and backward under the mechanical transmission means. The running speed of the vehicle is high, the transmission efficiency is high, and the method for operating this vehicle is the same as the usual vehicle.

Vehicles modified by using the mechanical and hydraulic composite transmission technology of the present embodiment could be driven to run forward and backward under the mechanical transmission means as common vehicles, and could also be changed to be driven at stepless variable speed under the mechanical and hydraulic composite transmission means. When the mechanical and hydraulic composite transmission device of the present invention is used to modify the cargo vehicle running in mining area, the cargo vehicle could run on the rough road at stepless variable speed. The vehicle can be changed to be driven fast under mechanical transmission means when it runs on the flat road. The vehicle is operated very comfortably, the damage to the main parts of the vehicle is slight and service life is long.

FIG. 4 is a supplementary transmission schematic diagram of basic structure of the second embodiment according to the present invention, and the solution will be described in more detail with reference to FIG. 4. When the mechanical and hydraulic composite transmission technology of the present invention is applied to modify the military vehicle, the military vehicle may move in the desert, on the snow-icing road and on the swampy road at extremely slow speed. Compared with the vehicle driven under the mechanical transmission means, the damage of the clutch friction pairs and the component failure caused by running slowly could be avoided, and the operation is simple. Compared with the vehicle driven under the hydraulic means, the power and capacity configured for the hydraulic transmission equipment are reduced and the transmission efficiency is increased. The vehicle is changed to be driven fast under the mechanical transmission means on the flat road so that the flexibility is high. When the modified military vehicle is used as a tractor to drag artillery or heavy equipment on the swampy road, one end of said traction transition shaft 44 is connected and mounted with a traction gear 41, and the other end extends out of the planetary gear case 17 to be connected and mounted to a traction hydraulic pump 43. The assembling gear 32 engages with and drives the traction gear 41. The traction hydraulic pump 43 is connected with and drives the traction hydraulic motor 42. The traction hydraulic motor 42 is connected with and drives the dragged vehicle or the heavy equipment. When the modified dragging vehicle runs at stepless variable speed driven under the mechanical and hydraulic composite means, the assembling gear 32 engages with and drives the traction gear 41 to rotate, the traction gear 41 interlocks with and drives the traction transition shaft 44 to rotate so as to drive the traction hydraulic pump 43 to rotate, the traction hydraulic pump 43 drives the traction hydraulic motor 42 to rotate so as to drive the dragged vehicle or the heavy equipment to run synchronously with the dragging vehicle. The above structure could drive the dragging vehicle and the dragged vehicle synchronously when the modified military vehicle drags the heavy equipment, such as artillery, to move on the swampy road. The transmission characteristic is low speed, large torque, and synchronous driving between the dragging vehicle and the dragged vehicle, which greatly improves the traffic capacity of the special vehicle on the special roads. A reversing mechanism is installed between the transfer shaft 15 and the transition gear 29, and the variable displacement hydraulic pump 5, the hydraulic motor 18, the traction hydraulic pump 43 and the traction hydraulic motor 42 are all able to work in two directions, and then the dragging vehicle and the dragged vehicle could be driven forward or backward synchronously. It's better to set both of the traction hydraulic pump 43 and the traction hydraulic motor 42 to be gear structures.

When the mechanical and hydraulic composite transmission technology of the present invention is applied to modify special vehicles, such as the sweeping car, the high pressure washing car and the fire fighting truck, the end of the transfer shaft 15 which extends out of the planetary gear case 17 is connected and mounted to the clutch 22 and the transmission 23. The transmission 23 is connected with and drives the working device on the vehicle. When the special vehicle runs at stepless variable speed, at the same time, the transfer shaft 15 distributes parts of power driven by the engine 2 to drive the clutch 22 and the transmission 23. The transmission 23 is connected with and drives the working device on the vehicle to work. The operation of the clutch 22 and the adjustment on the output speed of the transmission 23 can meet the requirements of variable speed, which is needed by the special vehicle to drive the working device on the vehicle to work. The rotation speed of the transfer shaft 15 could be adjusted steplessly and the working device could be driven at variable speed to satisfy the working need for variable jobs, which could be achieved by operating the hand throttle device 10 and adjusting the rotation speed of the engine 2. When the special vehicle is the sweeping car, the rotation speed of the blower and the brush cleaner could be kept substantially steady while the special vehicle is running at variable speed. The working quality of the sweeping car is steady. When the special vehicle is the fire fighting truck and the high pressure washing car, the water pressure and the flow amount of the high-pressure water pump could be kept steady while the vehicle is running at variable speed, which can satisfy the working need. The special vehicle modified by the mechanical and hydraulic composite transmission technology of the present invention achieves configuration of a single engine. The power system occupies small space in the vehicle. The working quality of the special vehicle is steady and the exhaust is low. When the working space is changed, the special vehicle is changed to be driven under the mechanical transmission means to run fast. The flexibility is good, the transmission efficiency is high and the fuel consumption is low.

The Third Embodiment

Figure 5:
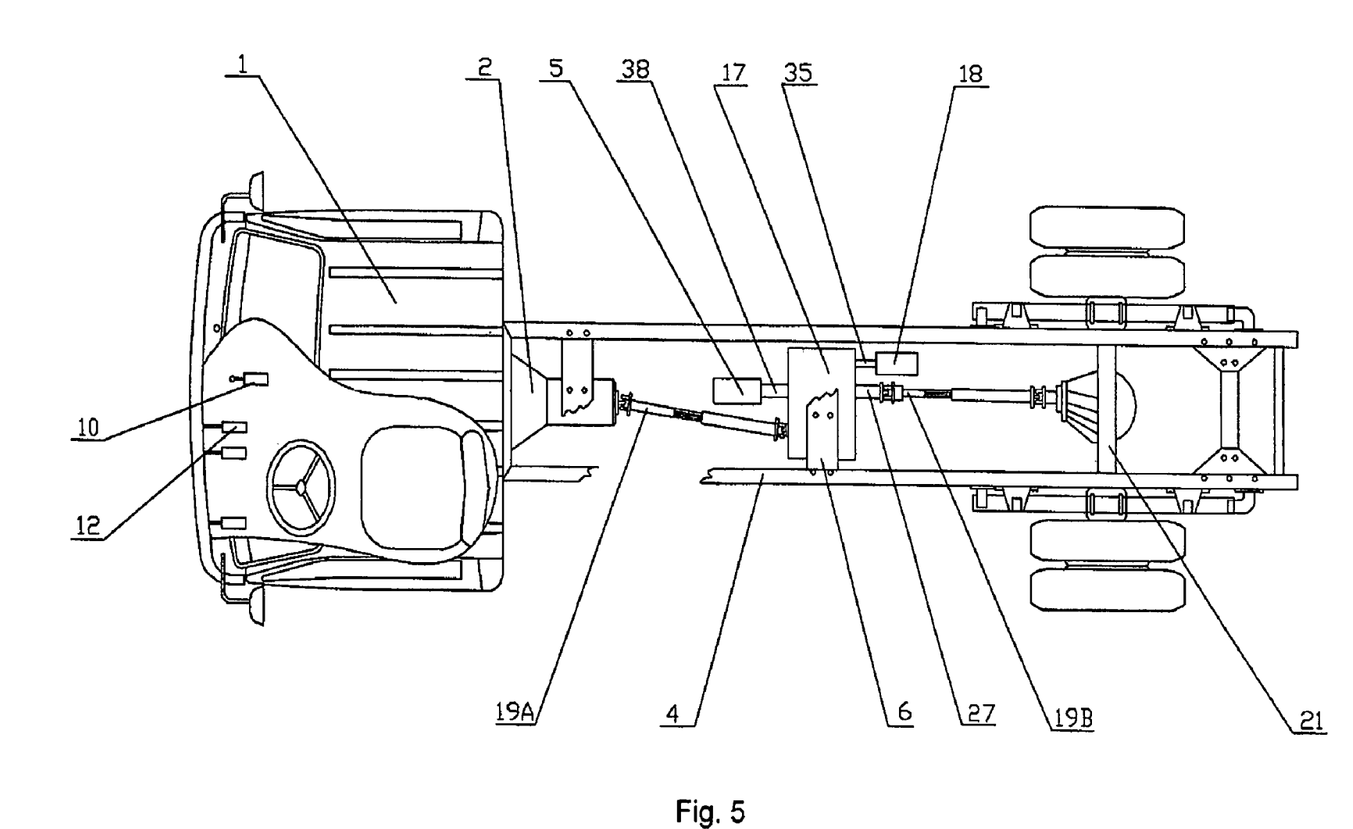
FIG. 5 is structural diagram of the third embodiment according to the present invention.

FIG. 5 is structural diagram of the third embodiment according to the present invention, and the solution is described in more detail with reference to FIG. 5.

The engine 2, the transmission 3 and the front frame 6 are mounted to the truck frame 4. The planetary gear case 17 is suspended under the front frame 6. The engine 2 is connected with and drives the front drive shaft 19A by the transmission 3. The front drive shaft 19A is connected with and drives the transfer shaft 15 of the planetary gear case 17. The transfer gear 16 tightly covers and is fixed to the transfer shaft 15. The transfer gear 16 engages with and drives the transition gear 29. The transition gear 29 is connected with a planetary carrier 33 coaxially and fixedly. Two or three planetary shafts 31 are mounted to the output end of the planetary carrier 33 vertically and equably. One planetary gear 30 covers each of the planetary shafts 31 respectively. The planetary gears 30 synchronously engage with and drive a sun gear 39 and internal teeth of a center gear 24. The center gear 24 is connected with and drives the half shaft 27. The sun gear 39 is connected and mounted to one end of a mean axis 38, and the other end of the mean axis 38 passes through the planetary carrier 33 and the transition gear 29, and then extends out of the planetary gear case 17 so as to be connected with and drive the variable displacement hydraulic pump 5. The variable displacement hydraulic pump 5 is connected with and drives the hydraulic motor 18 by being connected with a hydraulic pipeline 28. The hydraulic motor 18 is connected with and drives a hydraulic drive shaft 35. The hydraulic drive gear 34 is connected and mounted to one end of the hydraulic drive shaft 35 which extends into the planetary gear case 17. An assembling gear 32 covers and is fixed to the half shaft 27. The hydraulic drive gear 34 engages with and drives the assembling gear 32. One end of the half shaft 27 which extends out of the planetary gear case 17 is connected with and drives a back drive shaft 19B. The other end of the back drive shaft 19B is connected with and drives a rear-axle shaft 21 to drive the vehicle to run. In the cab 1, there is provided with a hand throttle device 10 and a variable displacement hydraulic pump foot pedal 12. Both of the variable displacement hydraulic pump 5 and the hydraulic motor 18 can rotate in positive and negative directions, or can be inverted by a reversing apparatus.

The operating process of the present embodiment is as follows: the engine 2 is started. The hand throttle device 10 is operated to make the engine 2 rotate at a medium speed. The engine 2 orderly drives the transmission 3, the front drive shaft 19A, the transfer shaft 15, the transfer gear 16, the transition gear 29, the planetary carrier 33, the planetary shaft 31 and the planetary gear 30 to rotate. The center gear 24 and the half shaft 27 do not rotate. The sun gear 39 and the mean axis 38 rotate and drive the variable displacement hydraulic pump 5 to rotate idly. The variable displacement hydraulic pump foot pedal 12 is pressed, and the variable displacement hydraulic pump foot pedal 12 sends a control signal to the variable displacement hydraulic pump 5. The variable displacement hydraulic pump 5 changes the inclination of the sloping cam plate to export the hydraulic oil so as to drive the hydraulic motor 18 to rotate. The hydraulic motor 18 orderly drives the hydraulic drive shaft 35, the hydraulic drive gear 34, the assembling gear 32, the half shaft 27, the back drive shaft 19B and the rear-axle shaft 21 to rotate. The rear-axle shaft 21 drives the vehicle to run. The mean axis 38 and the sun gear 39 feed back the drag torque, which is caused when the variable displacement hydraulic pump 5 exports the hydraulic power flow to drive the vehicle to run, to the planetary carrier 33 and the planetary shaft 31. The planetary shaft 31 and the planetary gear 30 drive the center gear 24 and the half shaft 27 to rotate. The half shaft 27 superposes the mechanical power flow driven by the center gear 24 and the hydraulic power flow driven by the hydraulic motor 18 to drive the back drive shaft 19B to rotate. The back drive shaft 19B drives the rear-axle shaft 21 to rotate so as to drive the vehicle to run forward. The transmission 3 is operated to be in the backward threshold and change the transmission direction of the variable displacement hydraulic pump 5 and the hydraulic motor 18 at the same time so as to implement the backward running of the modified vehicle.

The present embodiment is applied to modify the vehicle used for hauling airplane at the airport. Configured power of the hydraulic transmission parts in the modified vehicle is lower than the vehicle driven by full hydraulic pressure. The manufacturing cost of the vehicle is reduced, the transmission structure is simple, the operation is convenient, and the transmission efficiency is high. The transmission characteristics of the vehicle driven by full hydraulic pressure, such as low speed, large torque and stepless variable speed, are retained.

Figure 6:
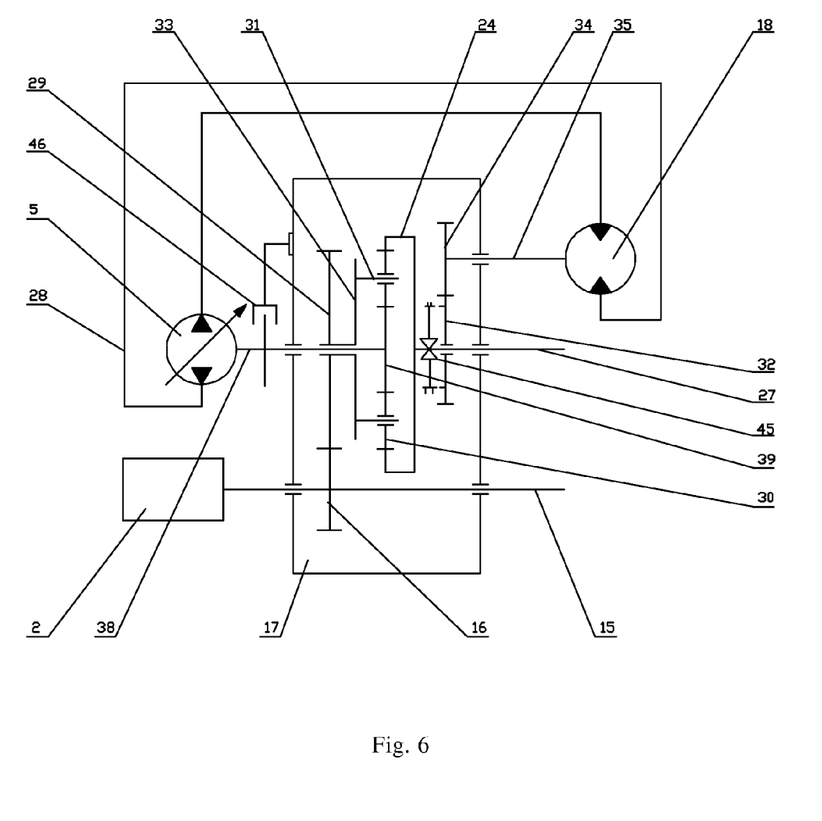

FIG. 6 is a supplementary transmission schematic diagram of basic structure of the third embodiment according to the present invention. The solution will be described in more detail with reference to FIG. 6. In the present embodiment, a retarding disc of the disk brake 46 further covers and is fixed to the mean axis 38 tightly. A caliper base of the brake 46 is fixed to the case body of the planetary gear case 17. The assembling gear 32 covers actively the half shaft 27, an inner loop of the clutch 45 tightly covers and is fixed to the half shaft 27 so that the transmission between the assembling gear 32 and the half shaft 27 may be engaged or disengaged by operating the clutch 45. An accelerator pedal 11 is set in the cab 1, and the zero position of the accelerator pedal 11 is actively connected with the zero position of the variable displacement hydraulic pump foot pedal 12 to form linkage action. The vehicle further modified in the present embodiment may be changed to be driven under the mechanical transmission means to run at variable speed. The disk brake 46 is operated to brake. All of the mean axis 38, the variable displacement hydraulic pump 5 and the sun gear 39 do not rotate. The clutch 45 is operated to be disconnected from the transmission connection between the assembling gear 32 and the half shaft 27. The rotation of the half shaft 27 is not limited by the assembling gear 32. The engine 2 is started, the transmission 3 is operated to be into forward threshold or backward threshold, and the accelerator pedal 11 is pressed. The engine 2 orderly drives the transmission 3, the front drive shaft 19A, the transfer shaft 15, the transfer gear 16, the transition gear 29, the planetary carrier 33, the planetary shaft 31, the planetary gear 30, the center gear 24, the half shaft 27 and the back drive shaft 19B to rotate. The back drive shaft 19B drives the rear-axle shaft 21 to rotate so as to drive the vehicle to run forward or backward. The vehicle modified according to the technical solution of the present embodiment could be driven under the mechanical and hydraulic composite transmission means to run at stepless variable speed, and also could be changed to be driven under the mechanical transmission means to run fast at variable speed.

One end of the transfer shaft 15 which extends out of the planetary gear case 17 is connected with and drives the clutch 22 and the transmission 23. The transmission 23 is connected with and drives the working device on the vehicle. The special vehicle modified in accordance with the present embodiment could be driven under the mechanical and hydraulic composite transmission means so as to run at variable speed, and at the same time, the working device on the vehicle could be driven under the mechanical transmission means to work steadily. When the working space is changed, the special vehicle could also be driven under the mechanical transmission means to run fast.

The planetary gear case 17 in the mechanical and hydraulic composite transmission device of the present invention has many kinds of variation design for its inner structure and many methods for being connected with and driving the outside parts. In the planetary gear case 17, the connection and transmission relationship of the mean axis 38, the half shaft 27 and the transition gear 29 with the outside parts could be exchanged mutually so as to form a technical solution having changed output characteristics. However, all the above solutions are variation of the basic structure and basic principle according to the technical solution of the present invention, and fall into the scope of the present invention. The electromagnetic clutch 36 may be a mechanical clutch. The control means of the variable displacement hydraulic pump 5 may be mechanical means, electronic means, and hydraulic means and so on. The engine 2 may be a power generating machine such as an electric motor. The planetary shaft 31 and the planetary gear 30 may be four or five. A drive shaft may be used to be connected between the half shaft 27 and the transmission transition shaft 40 to drive them. All of technical solutions of the present invention with local replacement based on the above same principle fall into the scope of the present invention.

Finally, it should be understood that the above embodiments are only used to explain, but not to limit the technical solution of the present invention. In despite of the detailed description of the present invention with referring to above preferred embodiments, it should be understood that various modifications, changes or equivalent replacements can be made by those skilled in the art without departing from the scope of the present invention and covered in the claims of the present invention.

What is claimed is:

1. A mechanical and hydraulic composite transmission device, comprising an engine (2), a variable displacement hydraulic pump (5) and a hydraulic motor (18), wherein the engine (2) is connected with and drives a planetary gear case (17), a planetary gear mechanism of the planetary gear case (17) distributes power driven by the engine (2) to drive the variable displacement hydraulic pump (5) and a half shaft (27) respectively, the variable displacement hydraulic pump (5) is connected with and drives the hydraulic motor (18) and the half shaft (27) orderly, and the half shaft (27) converges a hydraulic power flow driven by the hydraulic motor (18) and a mechanical power flow distributed and driven by the planetary gear mechanism to export power; the engine (2) is connected with and drives a transfer shaft (15), a transfer gear (16) tightly covers and is fixed to a part of the transfer shaft (15) extending into the planetary gear case (17), and the transfer gear (16) engages with and drives a transition gear (29); the transition gear (29) is connected with a planetary carrier (33) coaxially and fixedly, two or three planetary shafts (31) are connected and fixed to the output end of the planetary carrier (33) vertically and equably, one planetary gear (30) covers each of the planetary shafts (31) respectively, and all the planetary gears (30) synchronously engage with and drive a sun gear (39) and internal teeth of a center gear (24); the center gear (24) is connected with and drives the half shaft (27), the sun gear (39) is connected and mounted to one end of a mean axis (38), and the other end of the mean axis (38) passes through the planetary carrier (33) and the transition gear (29), and extends out of the planetary gear case (17) so as to be connected with and drive the variable displacement hydraulic pump (5); the variable displacement hydraulic pump (5) is connected with and drives the hydraulic motor (18) via a hydraulic pipeline (28), the hydraulic motor (18) is connected with and drives a hydraulic drive shaft (35), and the other end of the hydraulic drive shaft (35) extends into the planetary gear case (17) to make a hydraulic drive gear (34) be connected and mounted to the other end of the hydraulic drive shaft (35), an assembling gear (32) covers one part of the half shaft (27), and the hydraulic drive gear (34) engages with and drives the assembling gear (32); the half shaft (27) converges a mechanical power flow driven by the center gear (24) and a hydraulic power flow driven by the hydraulic drive gear (34), and extends out of the planetary gear case (17) to export power, wherein said engine (2) mounted to a truck frame (4) is connected with and drives a transmission (3), a power-take-off (13) is connected and mounted to a power-take-off interface of the transmission (3), a clutch device disengaged from or connected with and driving the transmission (3) is set in the power-take-off (13), an operating handle (8) for operating the clutch device is set in a cab (1), the power-take-off (13) is connected with and drives a drive shaft (14), and the drive shaft (14) is connected with and drives the transfer shaft (15); a front frame (6) and a back frame (7) are fixed tightly to the truck frame (4) respectively, the planetary gear case (17) is suspended under the front frame (6), and a transmission gearbox (20) is suspended under the back frame (7); one end of the half shaft (27) extending out of the planetary gear case (17) is connected with and drives a transmission transition shaft (40), a final transmission gear (37) tightly covers and is fixed to a part of the transmission transition shaft (40) extending into the transmission gearbox (20), a output shaft (25) is covered with a supplementary transmission gear (26) and is covered and fixed tightly with a electromagnetic clutch (36), junction surface on an inner bore of the electromagnetic clutch (36) is tightly and fixedly connected with the output shaft (25), junction surface on a plane of the electromagnetic clutch (36) is tightly and fixedly connected with the supplementary transmission gear (26), the final transmission gear (37) engages with and drives the supplementary transmission gear (26), an electromagnetic clutch switch (9) for operating the electromagnetic clutch (36) to disengage or engage is set in the cab (1); the transmission (3) is further connected with and drives a front drive shaft (19A), the other end of the front drive shaft (19A) is connected with and drives one end of the output shaft (25) extending out of the transmission gearbox (20), the other end of the output shaft (25) extending out of the transmission gearbox (20) is connected with and drives a back drive shaft (19B), and the back drive shaft (19B) is connected with and drives a rear-axle shaft (21) to drive a vehicle to run.

2. The mechanical and hydraulic composite transmission device according to claim 1, wherein said cab (1) is provided with an accelerator pedal (11) and a hand throttle device (10) therein, and is provided with a variable displacement hydraulic pump foot pedal (12) interlocked with the accelerator pedal to control the variable displacement hydraulic pump (5), and the variable displacement hydraulic pump foot pedal (12) is movably connected with the accelerator pedal (11) with the zero position of the variable displacement hydraulic pump foot pedal (12) corresponding to a medium speed position of the accelerator pedal (11).

3. The mechanical and hydraulic composite transmission device according to claim 1, wherein the other end of said transfer shaft (15) passing through the planetary gear case (17) is connected with and drives the clutch (22) and the transmission (23) orderly.

4. The mechanical and hydraulic composite transmission device according to claim 1, wherein said assembling gear (32) engages with and drivers a traction gear (41), the traction gear (41) is connected and mounted to one end of a traction transition shaft (44), the other end of the traction transition shaft (44) extends out of the planetary gear case (17) to make a traction hydraulic pump (43) be connected and mounted to the other end of the traction transition shaft (44), the traction hydraulic pump (43) is connected with and drives a traction hydraulic motor (42), and the traction hydraulic motor (42) is connected with and drives the dragged vehicle.

5. The mechanical and hydraulic composite transmission device according to claim 4, wherein said traction hydraulic pump (43) is a gear hydraulic pump, the traction hydraulic motor (42) is a gear hydraulic motor, a reversing apparatus is mounted between said transfer shaft (15) and the transition gear (29), and the variable displacement hydraulic pump (5), the hydraulic motor (18), the traction hydraulic pump (43) and the traction hydraulic motor (42) are two-way rotational structure.

6. A mechanical and hydraulic composite transmission device, comprising an engine (2), a variable displacement hydraulic pump (5) and a hydraulic motor (18), wherein the engine (2) is connected with and drives a planetary gear case (17), a planetary gear mechanism of the planetary gear case (17) distributes power driven by the engine (2) to drive the variable displacement hydraulic pump (5) and a half shaft (27) respectively, the variable displacement hydraulic pump (5) is connected with and drives the hydraulic motor (18) and the half shaft (27) orderly, and the half shaft (27) converges a hydraulic power flow driven by the hydraulic motor (18) and a mechanical power flow distributed and driven by the planetary gear mechanism to export power; the engine (2) is connected with and drives a transfer shaft (15), a transfer gear (16) tightly covers and is fixed to a part of the transfer shaft (15) extending into the planetary gear case (17), and the transfer gear (16) engages with and drives a transition gear (29); the transition gear (29) is connected with a planetary carrier (33) coaxially and fixedly, two or three planetary shafts (31) are connected and fixed to the output end of the planetary carrier (33) vertically and equably, one planetary gear (30) covers each of the planetary shafts (31) respectively, and all the planetary gears (30) synchronously engage with and drive a sun gear (39) and internal teeth of a center gear (24); the center gear (24) is connected with and drives the half shaft (27), the sun gear (39) is connected and mounted to one end of a mean axis (38), and the other end of the mean axis (38) passes through the planetary carrier (33) and the transition gear (29), and extends out of the planetary gear case (17) so as to be connected with and drive the variable displacement hydraulic pump (5); the variable displacement hydraulic pump (5) is connected with and drives the hydraulic motor (18) via a hydraulic pipeline (28), the hydraulic motor (18) is connected with and drives a hydraulic drive shaft (35), and the other end of the hydraulic drive shaft (35) extends into the planetary gear case (17) to make a hydraulic drive gear (34) be connected and mounted to the other end of the hydraulic drive shaft (35), an assembling gear (32) covers one part of the half shaft (27), and the hydraulic drive gear (34) engages with and drives the assembling gear (32); the half shaft (27) converges a mechanical power flow driven by the center gear (24) and a hydraulic power flow driven by the hydraulic drive gear (34), and extends out of the planetary gear case (17) to export power, wherein said engine (2) and a front frame (6) are mounted on a truck frame (4), the planetary gear case (17) is suspended under the front frame (6), the engine (2) is connected with and drives a front drive shaft (19A) via a transmission (3), the other end of the front drive shaft (19A) is connected with and drives the transfer shaft (15) of the planetary gear case (17), the half shaft (27) of the planetary gear case (17) is connected with and drives a back drive shaft (19B), and the back drive shaft (19B) is connected with and drives a rear-axle shaft (21) to drive the vehicle to run; the variable displacement hydraulic pump (5) and the hydraulic motor (18) are two-way rotational structure, and a hand throttle device (10) and a variable displacement hydraulic pump foot pedal (12) are set in a cab (1), wherein the hand throttle device (10) is used for adjusting rotation speed of the engine (2).

7. The mechanical and hydraulic composite transmission device according to claim 6, wherein a retarding disc of a disk brake (46) tightly covers and is fixed to said mean axis (38), and a caliper base of the disk brake (46) is fixed to the case body of the planetary gear case (17); the assembling gear (32) actively covers the half shaft (27), an inner loop of the clutch (45) tightly covers and is fixed to the half shaft (27) so that the transmission connection between the assembling gear (32) and the half shaft (27) can be engaged or disengaged by operating the clutch (45); an accelerator pedal (11) is set in the cab (1), the zero position of the accelerator pedal (11) is actively connected with the zero position of the variable displacement hydraulic pump foot pedal (12) to form linkage action.

8. The mechanical and hydraulic composite transmission device according to claim 6, wherein the other end of said transfer shaft (15) passing through the planetary gear case (17) is connected with and drives a clutch (22) and the transmission (23) orderly.

9. A mechanical and hydraulic composite transmission device, comprising an engine (2), a variable displacement hydraulic pump (5) and a hydraulic motor (18), wherein the engine (2) is connected with and drives a planetary gear case (17), a planetary gear mechanism of the planetary gear case (17) distributes power driven by the engine (2) to drive the variable displacement hydraulic pump (5) and a half shaft (27) respectively, the variable displacement hydraulic pump (5) is connected with and drives the hydraulic motor (18) and the half shaft (27) orderly, and the half shaft (27) converges a hydraulic power flow driven by the hydraulic motor (18) and a mechanical power flow distributed and driven by the planetary gear mechanism to export power; the engine (2) is connected with and drives a transfer shaft (15), a transfer gear (16) tightly covers and is fixed to a part of the transfer shaft (15) extending into the planetary gear case (17), and the transfer gear (16) engages with and drives a transition gear (29); the transition gear (29) is connected with a planetary carrier (33) coaxially and fixedly, two or three planetary shafts (31) are connected and fixed to the output end of the planetary carrier (33) vertically and equably, one planetary gear (30) covers each of the planetary shafts (31) respectively, and all the planetary gears (30) synchronously engage with and drive a sun gear (39) and internal teeth of a center gear (24); the center gear (24) is connected with and drives the half shaft (27), the sun gear (39) is connected and mounted to one end of a mean axis (38), and the other end of the mean axis (38) passes through the planetary carrier (33) and the transition gear (29), and extends out of the planetary gear case (17) so as to be connected with and drive the variable displacement hydraulic pump (5); the variable displacement hydraulic pump (5) is connected with and drives the hydraulic motor (18) via a hydraulic pipeline (28), the hydraulic motor (18) is connected with and drives a hydraulic drive shaft (35), and the other end of the hydraulic drive shaft (35) extends into the planetary gear case (17) to make a hydraulic drive gear (34) be connected and mounted to the other end of the hydraulic drive shaft (35), an assembling gear (32) covers one part of the half shaft (27), and the hydraulic drive gear (34) engages with and drives the assembling gear (32); the half shaft (27) converges a mechanical power flow driven by the center gear (24) and a hydraulic power flow driven by the hydraulic drive gear (34), and extends out of the planetary gear case (17) to export power, wherein a hand throttle device (10) and an accelerator pedal (11) used for respectively adjusting rotation speed of the engine (2) is set in a cab, and the cab is provided with a variable displacement hydraulic pump foot pedal (12) interlocked with the accelerator pedal to control the variable displacement hydraulic pump (5).

10. The mechanical and hydraulic composite transmission device according to claim 9, wherein the variable displacement hydraulic pump foot pedal (12) is movably connected with the accelerator pedal (11) with the zero position of the variable displacement hydraulic pump foot pedal (12) corresponding to a medium speed position of the accelerator pedal (11); or the zero position of the accelerator pedal (11) is actively connected with the zero position of the variable displacement hydraulic pump foot pedal (12) to form linkage action.

11. The mechanical and hydraulic composite transmission device according to claim 10, wherein said engine (2) and a front frame (6) are mounted on a truck frame (4), the planetary gear case (17) is suspended under the front frame (6), the engine (2) is connected with and drives a front drive shaft (19A) via a transmission (3), the other end of the front drive shaft (19A) is connected with and drives the transfer shaft (15) of the planetary gear case (17), the half shaft (27) of the planetary gear case (17) is connected with and drives a back drive shaft (19B), and the back drive shaft (19B) is connected with and drives a rear-axle shaft (21) to drive the vehicle to run; the variable displacement hydraulic pump (5) and the hydraulic motor (18) are two-way rotational structure.

12. The mechanical and hydraulic composite transmission device according to claim 11, wherein a retarding disc of a disk brake (46) tightly covers and is fixed to said mean axis (38), and a caliper base of the disk brake (46) is fixed to the case body of the planetary gear case (17); the assembling gear (32) actively covers the half shaft (27), an inner loop of the clutch (45) tightly covers and is fixed to the half shaft (27) so that the transmission connection between the assembling gear (32) and the half shaft (27) can be engaged or disengaged by operating the clutch (45).

13. The mechanical and hydraulic composite transmission device according to claim 11, wherein the other end of said transfer shaft (15) passing through the planetary gear case (17) is connected with and drives a clutch (22) and the transmission (23) orderly.

* * * * *